United States Patent [19]

Copeland et al.

[11] 4,299,341
[45] Nov. 10, 1981

[54] BICYCLE CARRIER RACK FOR AUTOMOBILES

[75] Inventors: Jerry T. Copeland, 18 Cherrywood Ave., Dayton, Ohio 45403; Ernest S. Vince, Dayton, Ohio

[73] Assignee: Jerry T. Copeland, Dayton, Ohio

[21] Appl. No.: 93,602

[22] Filed: Nov. 13, 1979

[51] Int. Cl.³ .............................................. B60R 9/10
[52] U.S. Cl. ............................................ 224/42.03 B
[58] Field of Search ................. 224/42.03 R, 42.03 A, 224/42.03 B, 314, 329; 211/17.22, 195, 198, 201, 204; 248/166, 434, 436

[56] References Cited

U.S. PATENT DOCUMENTS

| | | | |
|---|---|---|---|
| 1,887,840 | 11/1932 | Heawon | 211/204 |
| 2,154,833 | 4/1939 | Curtiss | 211/204 |
| 3,207,396 | 9/1965 | Mundell et al. | 224/42.03 B |
| 3,527,811 | 12/1975 | Nussbaum | 224/42.03 B |
| 3,670,935 | 6/1972 | Hinkston | 224/42.03 B |
| 3,841,544 | 10/1974 | Berger | 224/42.03 B |
| 3,927,810 | 12/1975 | Danon | 224/314 |
| 4,085,874 | 4/1978 | Graber | 224/42.03 B |
| 4,109,839 | 8/1978 | Allen | 224/314 |

Primary Examiner—Stephen Marcus
Attorney, Agent, or Firm—Jacox & Meckstroth

[57] ABSTRACT

A bicycle carrier rack of this invention is particularly adapted for use with an automobile having a bumper and a trunk adjacent the bumper, in which the trunk has an upwardly extending panel and a cover engageable with the upper edge of the panel to close the trunk. The bicycle carrier rack of this invention includes a pair of support members and means attaching the support members one to the other for relative movement therebetween. Engagement members are attached to the support members for engagement with the bumper of the automobile and for attachment of the carrier rack to the bumper with relative movement between the support members. Securing structure secures the support members with respect to the bumper. The securing structure includes an element which extends from a position adjacent the support members and is positionable between the upper edge of the upwardly extending panel of the trunk and the trunk cover to retain the bicycle carrier rack with respect to the bumper when the trunk cover is closed.

4 Claims, 10 Drawing Figures

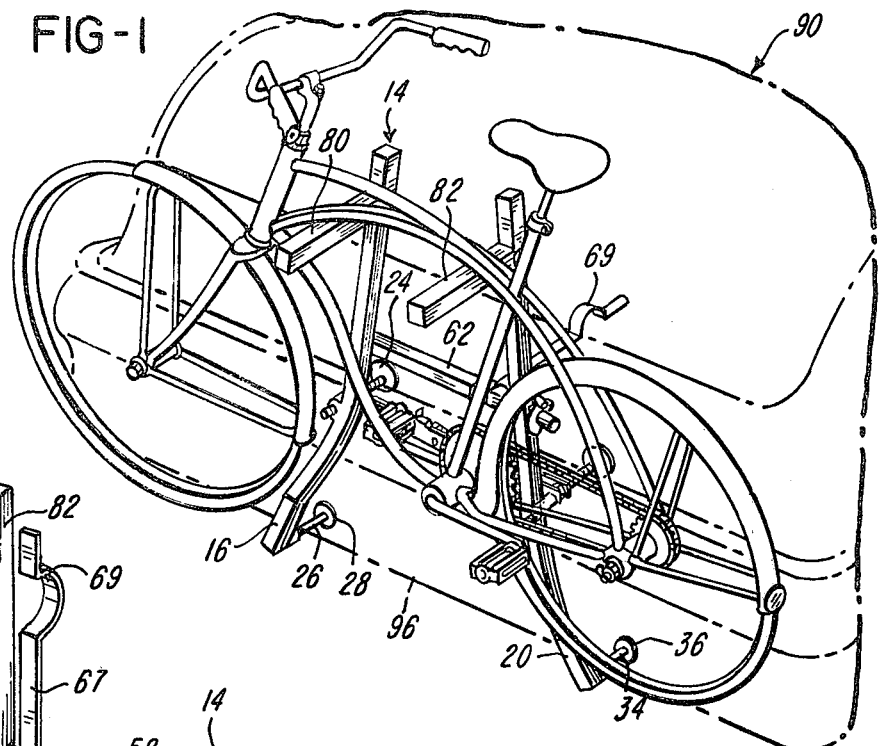
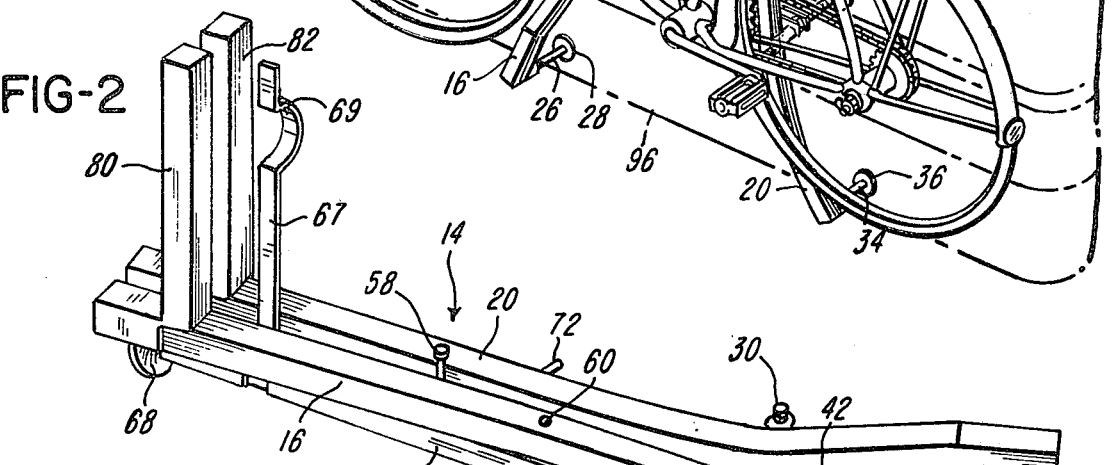
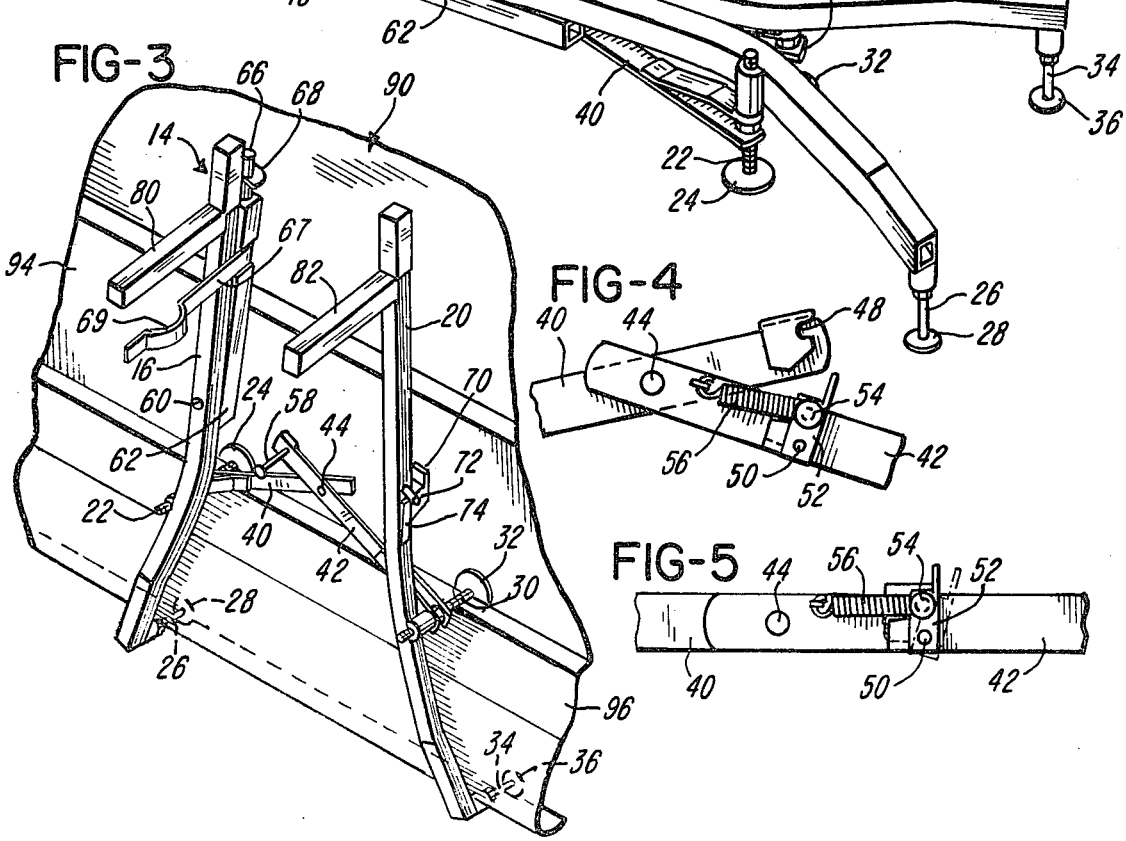
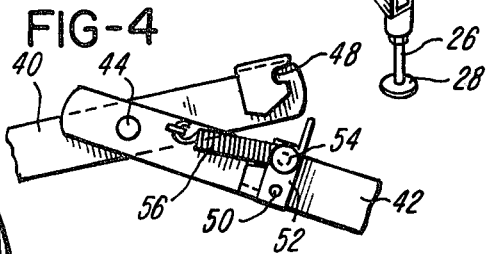
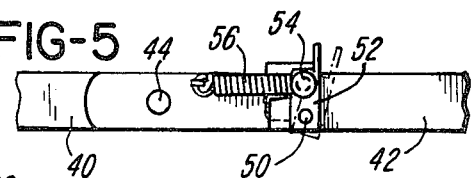

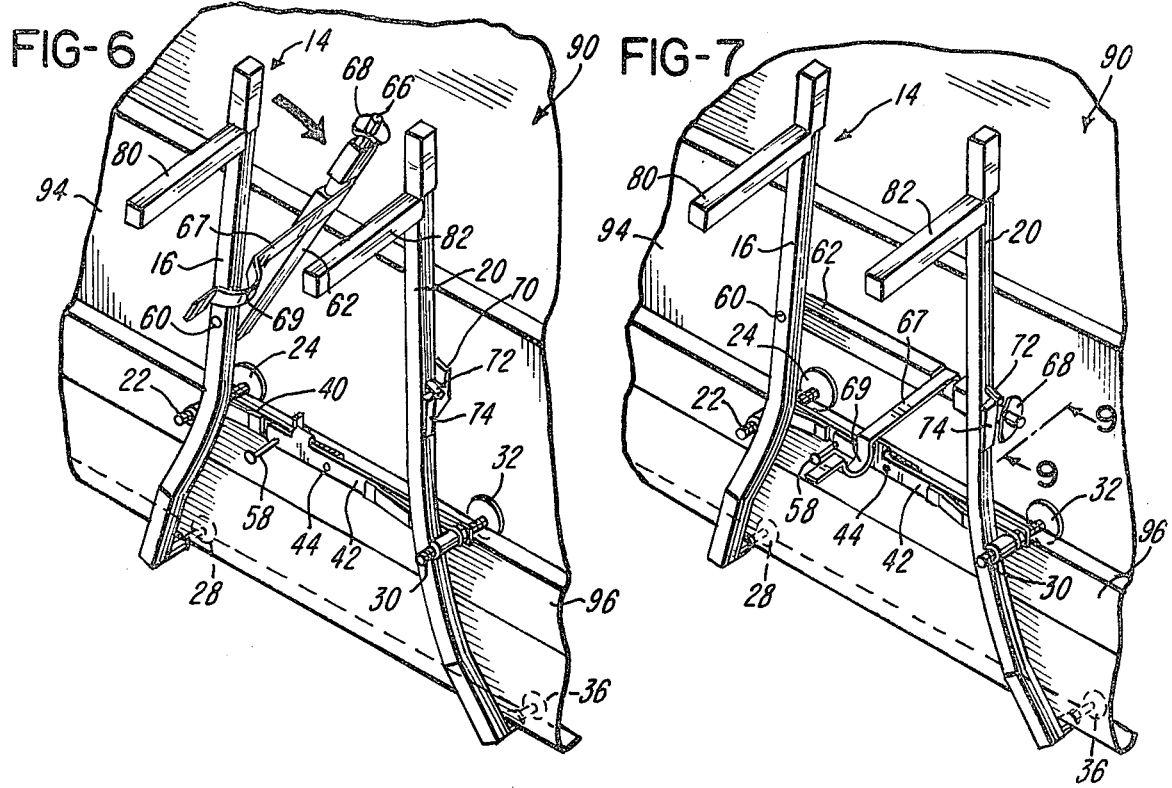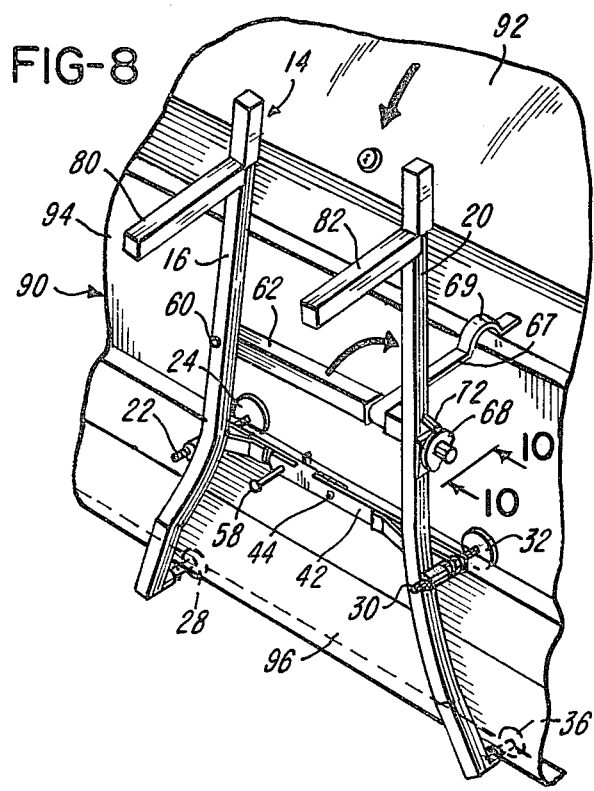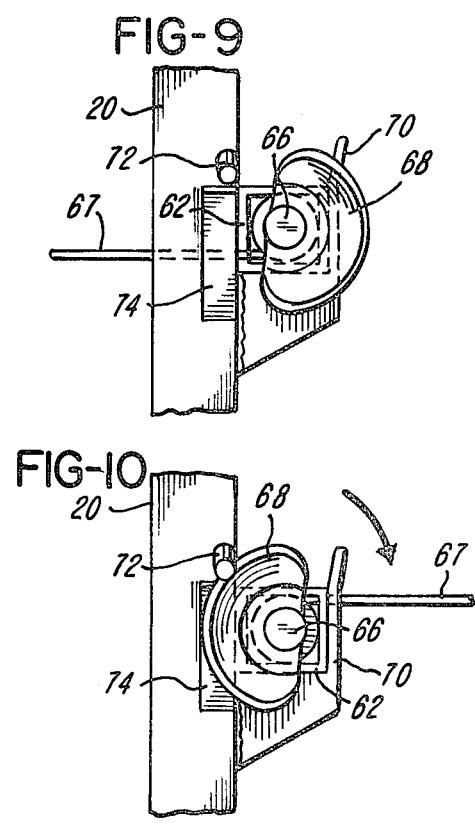

BICYCLE CARRIER RACK FOR AUTOMOBILES

BACKGROUND OF THE INVENTION

There are numerous types or styles of bicycle carrier racks for automobiles. However, most of such racks have several disadvantages. Many such known bicycle carrier racks require considerable space for storage and are not readily portable when not in use. Other known bicycle carrier racks are difficult and/or time-consuming to assemble or to mount or to attach to an automobile. Most known bicycle carrier racks may be easily stolen from an automobile. Therefore, both the carrier rack and each bicycle supported thereby may be easily stolen.

Other known bicycle carrier racks are so mounted that the trunk lid or cover cannot be moved to open position when the bicycle carrier rack is fully and completely attached to an automobile for support thereby.

Other known bicycle carrier racks are not capable of firm and strong support of a bicycle or a plurality of bicycles.

It is an object of this invention to provide a bicycle carrier rack which can be readily collapsed into a folded condition to occupy minimum space when not in use. Thus, the bicycle carrier rack can be readily stored or transported when not in use.

Another object of this invention is to provide such a bicycle carrier rack which can be readily and easily and quickly attached to an automobile for support thereby.

Another object of this invention is to provide such a bicycle carrier rack which is locked to the automobile when the bicycle carrier rack is mounted upon and supported by the automobile.

Another object of this invention is to provide such a bicycle carrier rack which does not interfere with opening of the trunk cover or lid when the bicycle carrier rack is completely attached to the automobile.

Another object of this invention is to provide such a bicycle carrier rack which is capable of firm and strong support of one or more bicycles.

Another object of this invention is to provide a rack which is attachable to an automobile for support of objects, devices, and materials other than bicycles.

Other objects and advantages of the bicycle carrier rack of this invention reside in the construction of parts, the combination thereof, the method of production, and the mode of operation, as will become more apparent from the following description.

BRIEF SUMMARY OF THE INVENTION

A bicycle carrier rack for automobiles of this invention comprises a pair of elongate main support members. A pair of connector members are pivotally attached to each of the main support members. The connector members are pivotally attached one to the other. The bicycle carrier rack also includes means for securing the angular relationship between the connector members. A cross-member has a pivotal portion pivotally connected to one of the main support members and a clamping portion engageable with the other main support member. An extension member is joined to the second connector member and is engageable with a trunk portion of the body of an automobile. The trunk cover is closeable upon a part of the extension member and secures the bicycle carrier rack to the automobile. The bicycle carrier rack also includes a pair of laterally extending support members, each of which is rigidly attached to one of the main support members. The laterally extending support members are adapted to support one or more bicycles.

BRIEF DESCRIPTION OF THE VIEWS OF THE DRAWINGS

FIG. 1 is a perspective view of a bicycle carrier rack of this invention as the bicycle carrier rack is mounted upon an automobile. This view also illustrates a bicycle supported by the carrier rack.

FIG. 2 is a perspective view drawn on a much larger scale than FIG. 1, showing a bicycle carrier rack of this invention in a folded or collapsed condition.

FIG. 3 is a perspective view, drawn on a smaller scale than FIG. 2, illustrating a bicycle carrier rack of this invention in a preliminary step of mounting the bicycle carrier rack upon an automobile.

FIG. 4 is a fragmentary elevational view, drawn on a larger scale than FIG. 3, showing a portion of connector members of a bicycle carrier rack of this invention.

FIG. 5 is a fragmentary elevational view, drawn on substantially the same scale as FIG. 4, showing the connector members of FIG. 4 in another position of operation.

FIG. 6 is a perspective view, drawn on substantially the same scale as FIG. 3, illustrating the bicycle carrier rack of this invention in a further step of mounting upon an automobile.

FIG. 7 is a perspective view, similar to FIGS. 3 and 6, illustrating a further step in mounting of a bicycle carrier rack of this invention upon an automobile.

FIG. 8 is a perspective view, similar to FIGS. 3, 6, and 7, illustrating a final step in mounting of a bicycle carrier rack of this invention upon an automobile.

FIG. 9 is an enlarged view taken substantially on line 9—9 of FIG. 7.

FIG. 10 is an enlarged view taken substantially on line 10—10 of FIG. 8.

DETAILED DESCRIPTION OF THE INVENTION

A bicycle carrier rack 14 of this invention comprises a pair of elongate support members 16 and 20. A stem 22 is attached to the support member 16 intermediate the ends thereof. The stem 22 is substantially normal to the support member 16 and has an engagement member 24 at the end thereof. Attached to the support member 16 adjacent the lower end thereof is a stem 26 which is normal to the support member 16 and has an engagement member 28 at the end thereof.

Attached to the support member 20 intermediate the ends thereof is a stem 30, normal to the support member 20, and having an engagement member 32 at the end thereof. Attached to the support member 20 adjacent the lower end thereof is a stem 34 which is normal to the support member 20 and has an engagement member 36 at the end thereof.

Pivotally attached to the stem 22 is an elongate connector member 40. Pivotally attached to the stem 30 is an elongate connector member 42. A pin 44 intermediate the ends of the connector members 40 and 42 pivotally attaches together the connector members 40 and 42. Adjacent the end of the connector member 40 is a socket 48. Pivotally attached to the connector member 42 by means of a pin 50 is a bracket 52 which has a lug 54 attached thereto. A spring 56 is attached to the connector member 42 and to the bracket 54 and urges pivotal movement of the bracket 54 toward the pin 44. A handle 58 is attached to the connector member 42, for pivotal movement thereof.

Pivotally joined to the support member 16 by means of a pin 60 is a cross-member 62. Rotatively attached to the cross-member 62 at the end thereof and in axial alignment therewith is a shaft 66. Secured to the shaft 66 adjacent the end thereof is a cam 68. Secured to the shaft 66 and extending laterally therefrom is an extension member 67 having an arcuate end portion 69. Attached to the support member 20 intermediate the ends thereof is a bracket 70. Adjacent the bracket 70 is a protuberance 72. Adjacent and below the protuberance 72 is a fixed cam surface 74.

Adjacent the upper end of the support member 16 is a laterally extending support arm 80. Adjacent the upper end of the support member 20 is a laterally extending support arm 82.

OPERATION

FIG. 2 shows a bicycle carrier rack 14 of this invention in a folded or collapsed condition. Thus, the bicycle carrier rack 14 can be stored or transported in a relatively small space.

FIGS. 1, 3, 6, 7, and 8 illustrate a portion of an automobile 90 which has a trunk cover or lid 92, a substantially vertical lower trunk panel or wall 94, and a rear bumper 96. When it is desired to mount the bicycle carrier rack 14 of this invention upon an automobile, such as the automobile 90, the elongate support members 16 and 20 are moved in directions one from the other as the connector members 40 and 42 are pivotally moved with respect thereto to position the connector members 40 and 42 in substantially aligned relationship. In this position of the connector members 40 and 42, the lug 54 of the bracket 52, which is attached to the connector member 42, is positioned within the socket 48 of the connector member 40. Then the support members 16 and 20 are angularly moved as the upper portions thereof are initially moved one from the other, and with such relative angular movement of the support members 16 and 20, the lower portions of the support members 16 and 20 are brought into engagement with the bumper 96, as the upper portions of the support members 16 and 20 are moved in directions one toward the other. The support members 16 and 20 are angularly moved to position the engagement members 24, 28, 32, and 36 in engagement with the inner surface of the bumper 96, as the support members 16 and 20 are in engagement with the outer surface of the bumper 96, as illustrated in FIG. 3.

Then the cross-member 62, which is attached to the support member 16, is pivotally moved toward the support member 20, as illustrated in FIG. 6. The cross-member 62 is pivotally moved until the end of the shaft 66 rests within the bracket 70 which is attached to the support member 20, as illustrated in FIG. 7. In this position the extension member 67 extends in a direction from the automobile 90, as illustrated in FIG. 7.

Then the extension member 67 is moved toward the automobile 90, as the shaft 66 is rotatively moved. When this occurs, the lid or cover 92 of the trunk of the automobile is in a raised position. The arcuate portion 69 of the extension member 67 is moved into a position over the upper edge of the lower trunk panel 94, as illustrated in FIG. 8. Then the trunk lid or cover 92 is moved to closed position and is in engagement with the upper edge of the lower panel of the trunk. When the lid or cover is closed and locked, the extension member 67 is secured to the trunk portion of the automobile 90, between the lower trunk panel 94 and the cover 92.

When the extension member 67 is pivotally moved from the position thereof shown in FIG. 7 to the position shown in FIG. 8, the shaft 66 is rotatively moved. Thus, the cam 68 is rotatively moved. Thus, the cam 68 rotates in engagement with the cam surface 74 and moves from the position thereof shown in FIG. 9 to the position thereof shown in FIG. 10. Such movement places tensional forces upon the shaft 66 and the cross-member 62, urging the upper portions of the support members 16 and 20 one toward the other. Such urging of the upper portions of the support members one toward the other, increases the clamping forces of the support members 16 and 20 upon the bumper 96. Thus, the support members 16 and 20 are clamped and secured to the bumper 96.

In the rotative position of the cam 68 as shown in FIG. 10, the cam 68 is below the protuberance 72 and cannot be lifted therefrom without rotative movement of the shaft 66. Thus, when the arcuate portion 69 of the extension member 67 is locked under the trunk cover 92, the cross-member 62 is locked in the position shown in FIG. 8. Furthermore, the entire bicycle carrier rack 14 is thus locked or secured to the automobile 90 and cannot be removed therefrom until the cover 92 is lifted and the extension member 67 rotatively moved in a direction from the automobile 90.

FIG. 1 illustrates use of the bicycle carrier rack 14 of this invention in which a bicycle is supported by the support arms 80 and 82.

The support arms 80 and 82 are adapted to support devices, articles and materials other than a bicycle or bicycles.

Although the preferred embodiment of the bicycle carrier rack of this invention has been described, it will be understood that within the purview of this invention various changes may be made in the form, details, proportion and arrangement of parts, the combination thereof, and the mode of operation, which generally stated consist in a structure within the scope of the appended claims.

The invention having thus been described, the following is claimed.

1. A bicycle carrier rack for attachment to an automobile which has a trunk compartment formed by an upwardly extending wall and a cover, the cover being engageable with the upper edge of the upwardly extending wall to close the trunk compartment, the automobile also having a bumper adjacent the upwardly extending wall, comprising:
a pair of elongate support members, there being a first elongate support member and a second elongate support member,
a pair of engagement members attached to each of the elongate support members and spaced laterally therefrom, the engagement members being adapted to engage the bumper on one portion thereof, while the elongate support members are positioned at the opposite portion of the bumper,
a connector member pivotally attached to each of the support members,
means pivotally attaching the connector members one to the other,
the support members thus being movable into adjacent substantially parallel relationship and into spaced-apart substantially parallel relationship, means for releasably retaining the connector members in a given relative angular relationship with the elongate support members in spaced-apart relationship, a cross-member pivotally joined to the first elongate support member, a shaft rotatably joined to the cross-member and extending longitudinally therefrom, a cam member attached to the shaft and rotatable therewith, the second elongate support member having a cam surface engageable by the cam member for urging relative angular movement of the support members and for securing the position of the cross-member and the shaft with respect to the second elongate support member, an extension member attached to the shaft and extending laterally therefrom for rotative movement thereof, the extension member having an engagement portion adapted to engage the upper edge of the upwardly extending wall of the automobile, the cover when in engagement with the upper edge of the upwardly extending wall maintaining the engagement portion of the extension member in engagement with the upper edge of the upwardly extending wall, the bicycle carrier rack thus being secured to the automobile when the cover is in engagement with the upper edge of the upwardly extending wall.

2. A bicycle carrier rack for attachment to an automobile having a bumper and a trunk formed by an upwardly extending panel and a cover which is engageable with the upper edge of the panel to close the trunk, comprising:

a pair of support members, there being a first support member and a second support member, means pivotally attaching together the support members for movement into closely spaced relationship and into spaced-apart relationship, attachment means carried by the support members for attaching the support members to the bumper when the support members are in spaced-apart relationship, a cross-member pivotally attached to the first support member, a shaft rotatably attached to the cross-member and extending axially therefrom, locking means joined to the shaft for operation with rotation of the shaft to secure the shaft to the second support member and securing the spaced-apart relationship of the support members, extension means joined to the shaft and extending therefrom and engageable with the upper edge of the panel, the extension member thus being secured to the upwardly extending panel when the cover of the trunk is in a closed position in engagement with the upper edge of the panel, the shaft thus being secured against rotation and the locking means thus securing the support members to the bumper.

3. A bicycle carrier rack for attachment to an automobile which has a bumper and a trunk compartment which is formed by an upwardly extending panel and a cover engageable with the upper edge of the panel to close the trunk, comprising:

a pair of support members, means attaching the support members together for movement of the support members to juxtaposition and for movement of the support members to spaced-apart relationship, engagement means carried by the support members for engagement with the bumper of the automobile and for attachment of the support members to the bumper, and means for securing the position of the support members with respect to the bumper and including means positionable between the upper edge of the panel of the trunk and retained in such position when the cover is in closed position in engagement with the upper edge of the panel.

4. A bicycle carrier rack for attachment to an automobile having a bumper and a trunk formed by a wall and a cover, the cover being movable to engage the wall to close the trunk comprising:

a pair of elongate support members, including engagement means for engagement with the bumper of the automobile to mount the elongate support members upon the bumper, and pivot means pivotally joining together the elongate support members for movement of the elongate support members to a collapsed condition in which the elongate support members are in juxtaposition and for movement of the elongate support members to spaced-apart positions, the pivot means including securing means securing the spaced relationship between the elongate support members, the pivot means pivotally joining together the elongate support members including a pair of connector members, there being one connector member pivotally attached to each of the elongate support members, and means pivotally attaching together the connector members.

* * * * *